(12) United States Patent
Tsai

(10) Patent No.: US 6,273,205 B1
(45) Date of Patent: Aug. 14, 2001

(54) POWER CLUTCH MECHANISM OF SCOOTER

(76) Inventor: Shui-Te Tsai, No. 12, Lane 441, Pu Na Street, Changhua (TW)

(*) Notice: Subject to any disclaimer, the term of this patent is extended or adjusted under 35 U.S.C. 154(b) by 0 days.

(21) Appl. No.: 09/661,298

(22) Filed: Sep. 13, 2000

(51) Int. Cl.⁷ .................................................. B62D 61/02
(52) U.S. Cl. .................. 180/181; 180/228; 180/298; 180/221
(58) Field of Search .................. 180/15, 205, 206, 180/207, 219, 220, 221, 227, 228, 298, 180, 181

(56) References Cited

U.S. PATENT DOCUMENTS

| | | | |
|---|---|---|---|
| 2,578,886 | * | 12/1951 | Isherwood et al. |
| 3,961,678 | * | 6/1976 | Hirano et al. ........................ 180/33 D |
| 4,974,695 | * | 12/1990 | Politte .................................. 180/221 |
| 5,388,659 | * | 2/1995 | Pepe .................................... 180/219 |
| 5,423,393 | * | 6/1995 | Felt ...................................... 180/22 |
| 5,491,390 | * | 2/1996 | McGreen ............................... 318/5 |
| 5,660,242 | * | 8/1997 | Witthaus ............................ 180/19.1 |
| 6,095,274 | * | 8/2000 | Patmont .............................. 180/181 |

FOREIGN PATENT DOCUMENTS

4240439  *  6/1994  (DE).

* cited by examiner

Primary Examiner—Paul N. Dickson
Assistant Examiner—Avraham H. Lerner
(74) Attorney, Agent, or Firm—Browdy and Neimark

(57) ABSTRACT

A power clutch mechanism of a scooter is formed of a power unit, an elastic member, a connection rod set, and an urging member. The power unit comprises a suspension seat pivoted with a footboard of the scooter, and a motor mounted on the suspension seat and provided with an output shaft on which a drive wheel is mounted in such a manner that the drive wheel is detachably engaged with a rear wheel of the scooter. The elastic member connects the suspension seat and a rear fork of the scooter. The connection rod set is formed of a first rod member and a second rod member pivoted with the first rod member by a pivot such that the second rod member and the first rod member form therebetween an angle, and that the first rod member is pivoted with the rear fork, and further that the second rod member is pivoted with the suspension seat. The urging member has a first end pivoted with the rear fork, and a second end removably urging the pivot of the connection rod set, thereby causing the drive wheel to be disengaged with the rear wheel of the scooter. When the pivot of the connection rod set is not urged by the urging member, the drive wheel is engaged with the rear wheel of the scooter.

4 Claims, 3 Drawing Sheets

POWER CLUTCH MECHANISM OF SCOOTER

FIELD OF THE INVENTION

The present invention relates generally to a scooter, and more particularly to a power clutch of the scooter.

BACKGROUND OF THE INVENTION

As shown in FIG. 1, a scooter power clutch of the prior art comprises a motor 1 which is pivoted to the rear fork 2 of the scooter such that the motor 1 is connected with the rear fork 2 by a spring 3. The motor 1 is further connected with a lever 8 by a steel cable 6. The lever 8 is pivoted to a handlebar 7. The output shaft 4 of the motor 1 is caused by the spring force of the spring 3 to make contact with a rear wheel 5 of the scooter, so as to move the scooter forward. As the lever 8 is actuated, the steel cable 6 overcomes the compression force of the spring 3 so as to enable the motor 1 to turn counterclockwise a predetermined angle, thereby causing the output shaft 4 of the motor 1 to move away from the rear wheel 5. The power of the motor is thus switched by the power clutch in accordance with the need of the rider of the scooter.

When the rider wants to ride the scooter manually, the rider must hold constantly the lever 8 so as to prevent the lever 8 from being actuated. It is tiresome to hold the lever 8 while riding the scooter manually.

SUMMARY OF THE INVENTION

The primary objective of the present invention is to provide a scooter with a power clutch which is free of the deficiencies of the prior art power clutch described above.

The power clutch is mounted on a scooter comprising a bottom board, a handlebar, a front wheel, at least one rear fork, and a rear wheel. The power clutch is formed of a power unit, an elastic member, a connection rod set, and an urging member. The power unit comprises a suspension seat mounted pivotally on the bottom board, a motor mounted on the suspension seat, and a drive wheel mounted on the output shaft of the motor such that the drive wheel is in contact with the rear wheel. The connection rod set is formed of a first rod member and a second rod member which is pivoted with the first rod member which is in turn fastened pivotally with the rear fork. The second rod member is pivoted with the suspension seat. The urging member has a first end pivoted to the rear fork, and a second end urging removably a pivot of the connection rod set. As the pivot is urged by the urging member, the angle formed by the two rod members becomes greater. As a result, the compression force of the elastic member is overcome to enable the suspension seat to swivel, so as to cause the drive wheel to separate from the rear wheel. When the pivot is not urged by the urging member, the drive wheel comes in contact with the rear wheel.

DETAILED DESCRIPTION OF THE INVENTION

Figure 1:
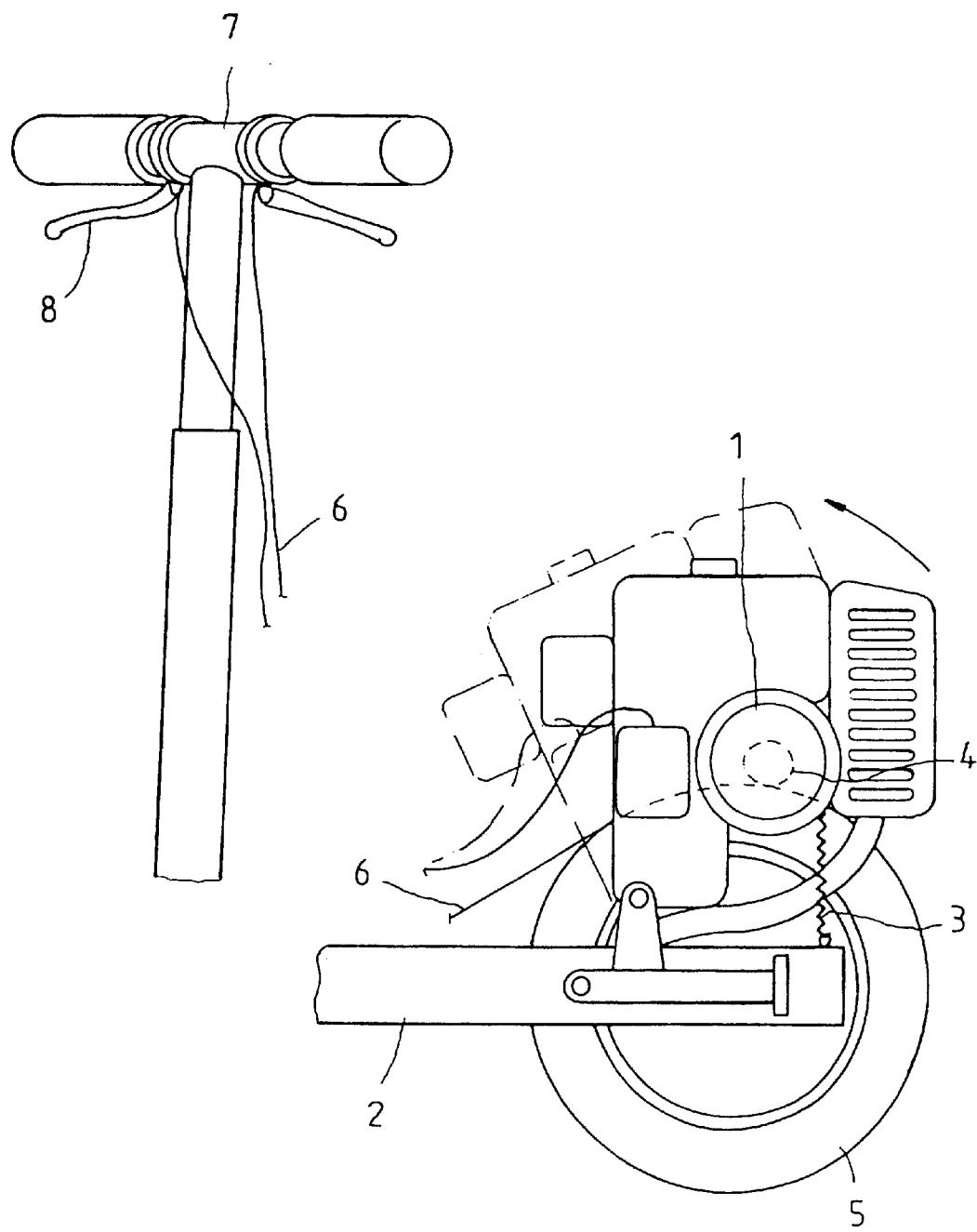
FIG. 1 shows a schematic view of a scooter power clutch of the prior art.
Figure 2:
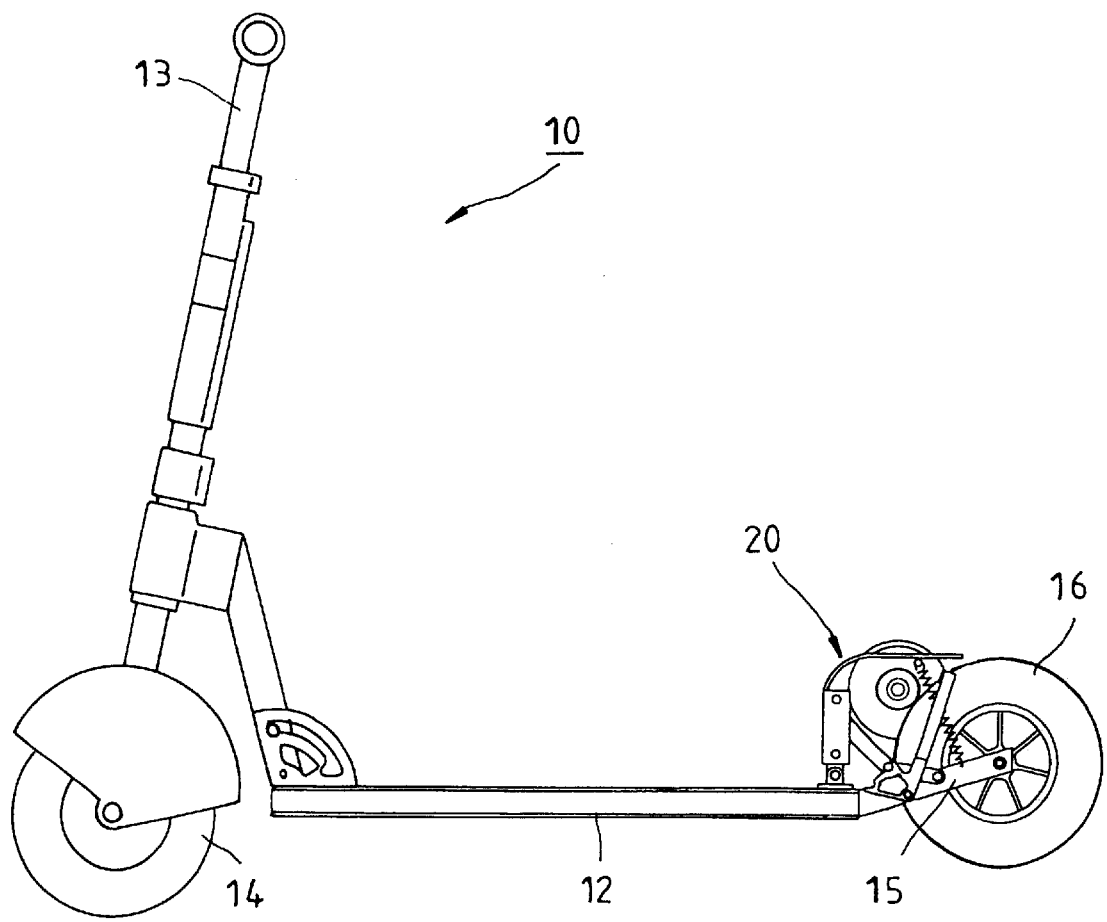
FIG. 2 shows a side view of a preferred embodiment of the present invention.

As shown in FIG. 2, a scooter power clutch 20 of the preferred embodiment of the present invention is mounted on a scooter 10 consisting of a rectangular footboard 12, a handlebar 13 pivoted at one end with the footboard 12, a front wheel 14 pivoted to the underside of front end of the footboard 12, two rear forks 15 extending from fear end of the footboard 12, and a rear wheel 16 pivoted to the rear forks 15. The power clutch 20 comprises a power unit 30, an elastic member 40, a connection rod set 50, and an urging member 60.

Figure 3:
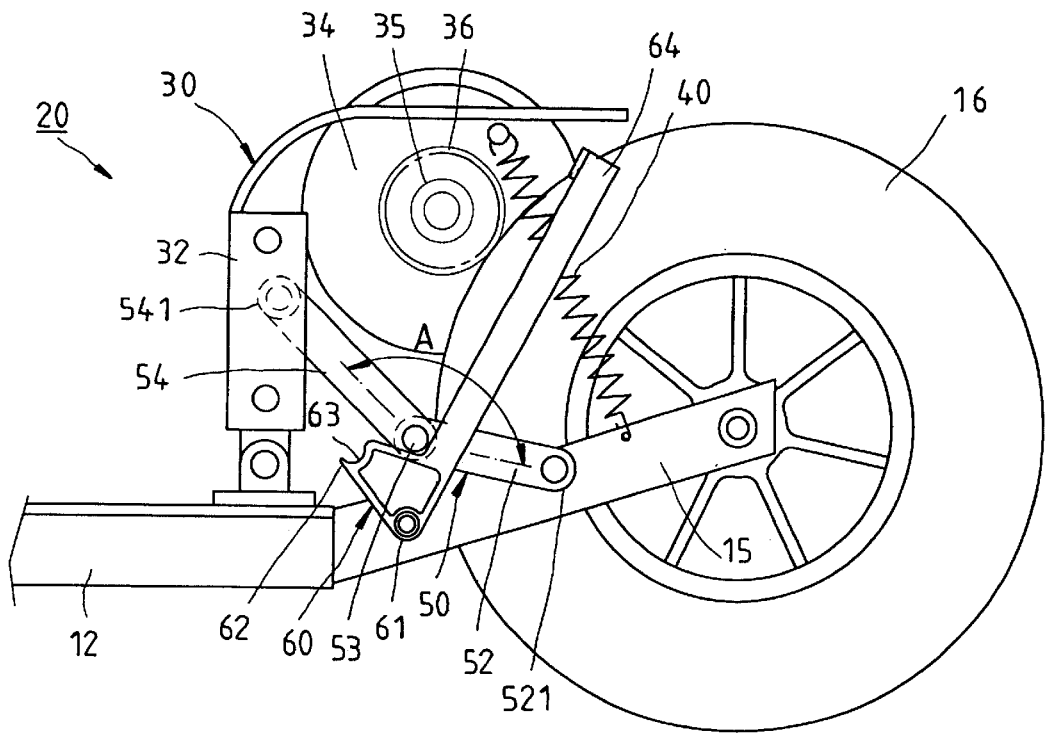
FIG. 3 shows a schematic view of the preferred embodiment of the present invention in a first state.
Figure 4:
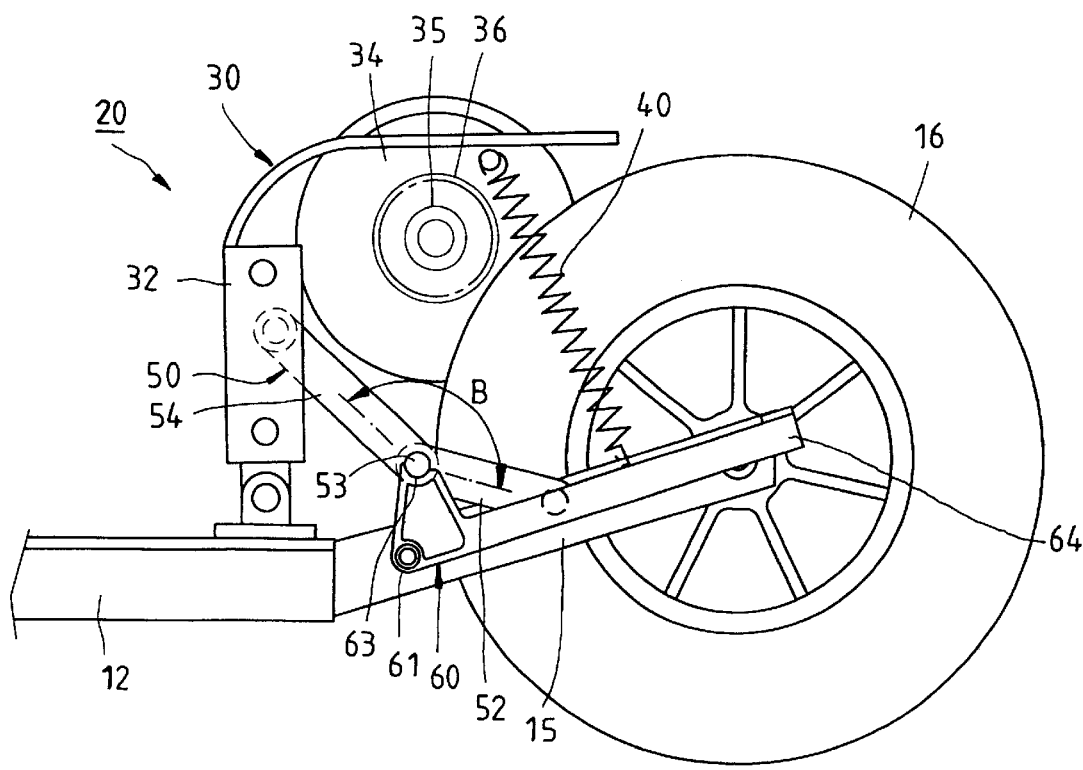
FIG. 4 shows a schematic view of the preferred embodiment of the present invention in a second state.

As shown in FIGS. 3 and 4, the power unit 30 comprises a suspension seat 32 which is pivoted at the bottom end with the footboard 12, a motor 34 mounted on the top end of the suspension seat 32 and provided with an output shaft 35, and a drive wheel 36 mounted on the output shaft 35 of the motor 34 such that the drive wheel 36 imparts the motion of the motor 34 to drive the rear wheel 16 of the scooter 10.

The elastic member 40 is a spring connecting the suspension seat 32 and the rear fork 15. The suspension seat 32 is caused by the spring force of the spring 40 to turn clockwise, so as to cause the drive wheel 36 to come in contact with the rear wheel 16.

The connection rod set 50 comprises a first rod member 52 and a second rod member 54 which is pivoted with the first rod member 52 by a pivot 53 such that the second rod member 54 and the first rod member 52 form therebetween an angle A. The first rod member 52 has a bottom end 521 which is pivoted with the rear fork 15. The second rod member 54 has a top end 541 which is pivoted with the suspension seat 32.

The urging member 60 has a bottom end 61 which is pivoted with the rear fork 15, and a top end 62 which is provided with a slot 63 for receiving the pivot 53 so as to urge the connection rod set 50. The urging member 60 further has a turning portion 64 extending from the bottom end 61 of the urging member 60 to facilitate the turning of the urging member 60 with hand, thereby causing the slot 63 to receive or move away from the pivot 53.

The scooter 10 is moved by the motor 34 by turning the turning portion 64 of the urging member 60 counterclockwise, thereby causing the slot 63 of the urging member 60 to move away from the pivot 53 of the connection rod member 50, as shown in FIG. 3. In the meantime, the suspension seat 32 is pulled by the spring 40 to enable the drive wheel 36 to come in contact with the rear wheel 16, which is thus driven by the motor 34 via the drive wheel 36.

The scooter 10 is moved without power by turning the urging member 60 clockwise so as to cause the slot 63 to receive the pivot 53, thereby resulting in formation of an angle B between the first rod member 52 and the second rod member 54. The angle B is greater than the angle A. In the meantime, the bottom end 521 of the first rod member 52 and the top end 541 of the second rod member 54 are farther apart from each other. The suspension seat 32 is thus forced to overcome the spring force of the spring 40 such that the suspension seat 32 swivels counterclockwise to cause the drive wheel 36 to move away from the rear wheel 16, as shown in FIG. 4. As a result, the rear wheel 16 can be moved without power.

What is claimed is:

1. A power clutch mechanism of a scooter consisting of a footboard, a handlebar pivoted with the footboard, a rear wheel pivoted to the footboard, at least one rear fork extending from the rear end of the footboard, and a rear wheel pivoted to the rear fork, said power clutch mechanism comprising:

a power unit comprising a suspension seat pivoted at one end with the footboard, a motor mounted on said suspension seat and provided with an output shaft, and a drive wheel mounted on said output shaft of said motor such that said drive wheel drives the rear wheel of the scooter;

an elastic member connecting said suspension seat and the rear fork of the scooter for forcing said drive wheel to come in contact with the rear wheel of the scooter;

a connection rod set comprising a first rod member and a second rod member pivoted with said first rod member by a pivot such that said second rod member and said first rod member form therebetween a predetermined angle, and that a free end of said first rod member is pivoted with the rear fork, and further that a free end of said second rod member is pivoted with said suspension seat; and an urging member pivoted at a first end thereof with the rear fork such that a second end of said urging member urges removably said pivot of said connection rod set, thereby resulting in formation of an angle between said first rod member and said second rod member, with said angle being greater than said predetermined angle so as to cause said suspension seat to swivel to enable said drive wheel to move away from the rear wheel of the scooter whereby said drive wheel is engaged with the rear wheel at the time when said pivot of said connection rod set is not urged by said second end of said urging member.

2. The power clutch mechanism as defined in claim 1, wherein said elastic member is a spring.

3. The power clutch mechanism as defined in claim 1, wherein said second end of said urging member is provided with a slot to receive said pivot.

4. The power clutch mechanism as defined in claim 1, wherein said first end of said urging member is provided with a turning portion extending therefrom to facilitate the turning of said urging member with hand.

\* \* \* \* \*